US012208990B2

(12) United States Patent
Neszmerak et al.

(10) Patent No.: US 12,208,990 B2
(45) Date of Patent: Jan. 28, 2025

(54) RAIL FASTENING DEVICE FOR GUIDE RAIL SECTIONS OF AN ESCALATOR OR MOVING WALKWAY

(71) Applicant: INVENTIO AG, Hergiswil (CH)

(72) Inventors: Wolfgang Neszmerak, Vienna (AT); Alexander Pfeiler, Vienna (AT)

(73) Assignee: Inventio AG, Hergiswil (CH)

( * ) Notice: Subject to any disclaimer, the term of this patent is extended or adjusted under 35 U.S.C. 154(b) by 40 days.

(21) Appl. No.: 18/253,158

(22) PCT Filed: Dec. 2, 2021

(86) PCT No.: PCT/EP2021/083901

§ 371 (c)(1),
(2) Date: May 16, 2023

(87) PCT Pub. No.: WO2022/135860

PCT Pub. Date: Jun. 30, 2022

(65) Prior Publication Data

US 2023/0416056 A1 Dec. 28, 2023

(30) Foreign Application Priority Data

Dec. 21, 2020 (EP) .................................... 20215863

(51) Int. Cl.
*B66B 23/14* (2006.01)

(52) U.S. Cl.
CPC .................................. *B66B 23/14* (2013.01)

(58) Field of Classification Search
CPC ......... B66B 23/14; B66B 23/20; B66B 23/22; B66B 23/24; B66B 23/00; B66B 25/00; B66B 27/00; B66B 29/00; B66B 31/00
(Continued)

(56) References Cited

U.S. PATENT DOCUMENTS 2,686,585 A * 8/1954 Margles .................. B66B 21/04 198/332
3,707,220 A * 12/1972 Boltrek .................. B66B 23/04 198/332
(Continued)

FOREIGN PATENT DOCUMENTS

CN 109292603 2/2019
DE 102018213647 A1 * 8/2019
(Continued)

OTHER PUBLICATIONS

International Search Report for International Application No. PCT/EP 2021/083901 dated Feb. 11, 2022.

*Primary Examiner* — Gene O Crawford
*Assistant Examiner* — Muhammad Awais
(74) *Attorney, Agent, or Firm* — Knobbe, Martens, Olson & Bear, LLP

(57) ABSTRACT

The disclosure relates to a rail fastening device for fastening guide rail sections in a guide rail system of an escalator or a moving walkway. The guide rail system includes at least one side plate having a hole, wherein the area of the hole has a hole length which is greater than its hole width. The rail fastening device has a rail receiving part, a screw connection and a clamping bar piece, wherein the length and width of the clamping bar piece match the hole width and the hole length of the hole such that said clamping bar piece can be guided through the hole in a first position and can be supported on the material of the side plate surrounding the hole in a second position, in the fully assembled state.

19 Claims, 3 Drawing Sheets

(58) Field of Classification Search
USPC .................................................. 198/321, 338
See application file for complete search history.

(56) References Cited

U.S. PATENT DOCUMENTS

| | | | | | |
|---|---|---|---|---|---|
| 4,484,674 | A * | 11/1984 | Lunardi | B66B 23/14 | 198/860.3 |
| 7,597,182 | B2 * | 10/2009 | Illedits | B66B 23/026 | 198/330 |
| 9,682,847 | B2 * | 6/2017 | Matheisl | B66B 23/12 | |
| 10,138,093 | B2 * | 11/2018 | Inoue | B66B 21/04 | |

FOREIGN PATENT DOCUMENTS

| | | | |
|---|---|---|---|
| EP | 0054687 | A1 | 6/1982 |
| EP | 0054687 | B1 | 12/1984 |
| EP | 1 902 996 | B1 | 11/2011 |

* cited by examiner

RAIL FASTENING DEVICE FOR GUIDE RAIL SECTIONS OF AN ESCALATOR OR MOVING WALKWAY

TECHNICAL FIELD

The present disclosure relates to a rail fastening device for fastening guide rail sections in a guide rail system of an escalator or moving walkway.

SUMMARY

By means of such guide rail systems the moving elements are supported and guided along their continuous path, it being intended for running of said moving elements which is as quiet and vibration-free as possible to be achieved. In the case of escalators, the guide rail systems also serve to guide the tread of the moving elements, designed as steps, when passing over the upper run, both horizontally and in the rising region, and horizontally in the transitions.

An escalator structure is also known from EP 1 902 996 B1, in which guide rail systems having guide rail sections are provided in the deflection regions. Said guide rail systems essentially comprise two vertically arranged side plates which are connected to one another by means of cross members. The guide rail sections are welded to said side plates. Special receiving devices are used during production, for exactly orienting the guide rail sections. Said receiving devices contain precisely arranged clamping devices for the components that are to be welded together, and ensure, on account of corresponding machining, sufficiently accurate parallelism and alignment. Thus, for assembly, the guide rail sections are held in a fixed mutual association by means of the clamping devices, and are connected, by said devices, by means of precision welding. Even small deviations could lead to what is known as “diagonal pull” of the moving elements, which causes increased wear and, associated therewith, a high energy consumption and a short service life.

Such precision can be achieved only at the manufacturer’s facilities, at workstations prepared for this, but not at a site of use, when, for example, the guide rail sections, subjected to wear, of an existing escalator or an existing moving walkway, have to be replaced.

Although the guide rail sections can be separated from the side plate by means of an angle grinder, the necessary apparatus and labor outlay for welding the new guide rail sections at the site of use would be so great that this cannot be said to be a quick and cost-effective assembly process. Furthermore, despite this significant outlay, the synchronization of the moving elements cannot be ensured to the required extent. This is because the side plate of the guide rail system is installed in the structural framework of the escalator or the moving walkway, and warpage results in the structure on account of the introduction of heat. This cannot be overcome by subsequent cold and hot straightening, on account of the surrounding framework. Furthermore, for fire-related reasons, carrying out welding work on an existing escalator or an existing moving walkway is forbidden at many sites of use.

DE 10 2018 213 647 A1 discloses a rail fastening device, the use of which makes welding of the guide rail sections unnecessary, since said device comprises a one-piece rail receiving part and two tensioning screws. Proceeding from a rear side of a side plate of the escalator, the rail receiving part can be pushed through a hole of the side plate. The rail fastening device passing through the side plate receives, in the rail receiving region thereof, the guide rail arranged on the front side of the side plate. Tightening the tensioning screws tensions the guide rail against the front side of the side plate, since the guide rail is firmly clamped between a lug of the rail receiving region and the side plate by tightening the tensioning screws. However, a rail fastening device of this kind can only be used if both sides of the side plate are accessible.

However, it is problematic that access to the side plate installed in the structural framework is possible only from the front side or guide rail side to which the guide rail sections are welded, but not from the rear side. This is because, at the site of use, parts of the structural framework, and in particular walls of the cavity of the building receiving the escalator or moving walkway, block access to the rear side or opposite side of the side plate.

The object of the present disclosure is therefore that of providing a rail fastening device for fastening guide rail sections, which device allows for precise and simple assembly on a side plate of a guide rail system, in particular, at the site of use.

This object is achieved by a rail fastening device for fastening guide rail sections in a guide rail system of an escalator or moving walkway. The guide rail system comprises at least one side plate having a hole, the area of the hole having a hole length which is greater than its hole width. In this case, “area” means the dimensions of the hole extending in the side surface of the side plate. In other words, this is the cross section of the hole defined by the hole length and the hole width, which is preferably constant over the entire thickness of the side plate.

The rail fastening device comprises a rail receiving part, a screw connection and a clamping bar piece. Said components can be brought from a pre-assembled state into a fully assembled state. In the pre-assembled state, the clamping bar piece can be connected to the rail receiving part by means of the screw connection, in such a way that the clamping bar piece is pivotable, relative to the rail receiving part, about the central longitudinal axis of the screw.

The rail receiving part comprises a rail receiving region and a support surface. In the fully assembled state, the support surface is supported against the side plate, and the guide rail section is fixed in the rail receiving region. The length and width of the clamping bar piece are matched to the hole width and the hole length of the hole such that, in the pre-assembled state, the clamping bar piece can be guided through the hole in a first position, and in a second position, in the fully assembled state, can be supported on the material of the side plate that surrounds the hole. In other words, in the fully assembled state, a region of the rail fastening device protrudes through the hole and clamps edge portions of the hole of the side plate between the support surface and the surfaces of the clamping bar piece which face the side plate and are in contact thereon. This achieves a very stable and wide bracing of forces which act on the rail receiving part and have to be braced via the side plate.

At this point it should be mentioned that the guide rail to be fastened or the guide rail section to be fastened can be fastened to the rail receiving part by further fastening means, such as screws, pins, rivets, brackets or the like. In one embodiment, the rail receiving part can comprise, in the rail receiving region, a contact face and a protrusion. In this case, the width of the contact face defined by the protrusion is slightly shorter than the width of the guide rail. If the screw connection of the rail fastening device is now tightened, the support surface is supported against the side plate, and in addition the guide rail or the guide rail section is clamped between the side plate and the protrusion. This is the case all the more because, due to the arrangement of the screw connection between the support surface and the protrusion, significant leverage can be achieved with respect to the clamping force between the side plate and the protrusion.

With regard to the cross section of the clamping bar piece, which is intended to be guided through the hole, any desired shapes are conceivable, provided that they allow for the clamping bar piece to be pushed through the hole in a first position and then, pivoted into the second position, can rest on the side plate. In order to simplify the manufacture, the outlines or the cross section of the clamping bar piece to be pushed through are rectangular in shape, corresponding to the area of the hole.

In order to facilitate the assembly, a pivot weight can be arranged on the clamping bar piece, which weight automatically pivots the clamping bar piece of the pre-assembled rail fastening device, on account of gravity, from the first position into the provided second position, after said piece has been guided through the hole.

In order to secure the screw connection of a fully assembled rail fastening device, an anaerobic adhesive or microencapsulated adhesive may be provided. The anaerobic adhesive is applied to the screw thread during the pre-assembly in such a way that it reaches between the screw thread and the nut thread only when the screw is tightened. The use of screws, to the thread of which microencapsulated adhesive has already been applied by the screw manufacturer and which adhesive is released by screwing into the nut thread, is substantially easier. Of course, other screw locking means are also possible, the most secure and at the same time the simplest possibility consisting in providing a sufficient linear extension of the screw connection.

Furthermore, the rail fastening device can comprise a counter holder which can be fastened to the side plate. If the rail fastening device is in the fully assembled state, the guide rail section fastened to the side plate is arranged between the rail receiving part and the counter holder. A counter holder of this kind thus prevents the guide rail section from being able to lift off from the rail receiving part.

In one embodiment of the rail fastening device, an anti-rotation device can be provided on the clamping bar piece. By means of said anti-rotation device, a torque applied to the clamping bar piece by the screw connection can also be supported in the hole. This on the one hand facilitates the course of the assembly, and on the other hand the anti-rotation device prevents the clamping bar piece from itself no longer being able to be pivoted away, on account of vibrations, when the preload force of the tightened screw connection is insufficient. In order to allow for pivoting of the clamping bar piece from the first into the second position, it is merely necessary to ensure that said piece is sufficiently far apart from the rail receiving part, in the pre-assembled state, that the anti-rotation device thereof does not come into form-fitting connection with the hole.

Alternatively thereto or in combination with the anti-rotation device described above, in a further embodiment of the rail fastening device, an anti-rotation device can be provided on the rail receiving part. By means of said anti-rotation device, a torque applied to the rail receiving part by the screw connection can also be supported in a form-fitting manner in the hole.

In order to simplify the assembly of a guide rail section, the rail fastening device is preferably pre-assembled. In the pre-assembled state, the rail receiving part is connected to the clamping bar piece by means of the screw connection. In order that the pre-assembled rail fastening device can be fastened to the side plate, an assembly spacing must be preset between the rail receiving part and the clamping bar piece, which spacing is greater than a thickness of the side plate in the region of the hole. This is because the clamping bar piece otherwise still protrudes in part into the hole and therefore cannot be pivoted.

The above-mentioned rail fastening device is equally suitable for guide rail systems of an escalator or a moving walkway, the guide rail system comprising at least one guide rail section and at least one side plate having at least one hole. If no holes are present, at least one hole can be cut in the side plate at a suitable location, for example, with the aid of a stencil and a suitable tool. In this case, the area of the hole must have a hole length which is greater than its hole width. Subsequently, at least one rail fastening device of the type described above can be arranged in the at least one hole, by means of which device at least one guide rail section can be fastened to the at least one side plate.

The rail fastening device is thus suitable, in particular, for an escalator or a moving walkway comprising at least one guide rail system, the guide rail system comprising at least one side plate to which guide rail sections can be fastened.

In the case of maintenance or modernization of the guide rail system of an escalator or of a moving walkway, various steps are to be carried out. The guide rail system thereof comprises at least one side plate which comprises at least one hole. If no hole is present, it can be created as described above. It may be simpler to install a new side plate having corresponding holes, if said side plate is fastened by means of screw connections in the structural framework of the escalator or of the moving walkway, and not welded in. As already described above, the area of the hole must have a hole length which is greater than its hole width. In order to fasten guide rail sections in the guide rail system, the rail fastening device is pre-assembled in that the rail receiving part is connected to the clamping bar piece by means of the screw connection. In this case, an assembly spacing is preset between the rail receiving part and the clamping bar piece, which spacing is greater than a thickness of the side plate in the region of the hole.

In a further step, the clamping bar piece of a pre-assembled rail fastening device is brought into a first position and thus oriented, with respect to its length and width, to the hole length and the hole width of the hole. In a further step, the clamping bar piece can then be guided through the hole until the support surface of the rail receiving part rests on the side plate. Thereafter, the clamping bar piece is pivoted about the central longitudinal axis of the screw connection and thus moved into a second position. Subsequently, in a further step, the rail fastening device is brought into a fully assembled state in that the screw connection is tightened with a predetermined tightening torque. In this case, the clamping bar piece should be held in the second position until the clamping bar piece rests on the material of the side plate surrounding the hole and the support surface of the rail receiving part and/or of the guide rail section to be fastened is pressed against the side plate. The clamping bar piece can be held in the second position, for example, by means of the described anti-rotation device or by means of a screwdriver which is temporarily pushed laterally through the hole during tightening of the screw connection, and thus prevents further pivoting of the clamping bar piece.

BRIEF DESCRIPTION OF THE DRAWINGS

Embodiments of the disclosure will be described below with reference to the accompanying drawings, wherein neither the drawings nor the description are intended to be interpreted as limiting the disclosure. In the figures.

The figures are merely schematic and not true to scale. In the different figures, identical reference signs denote identical or similar features.

DETAILED DESCRIPTION

Figure 1:
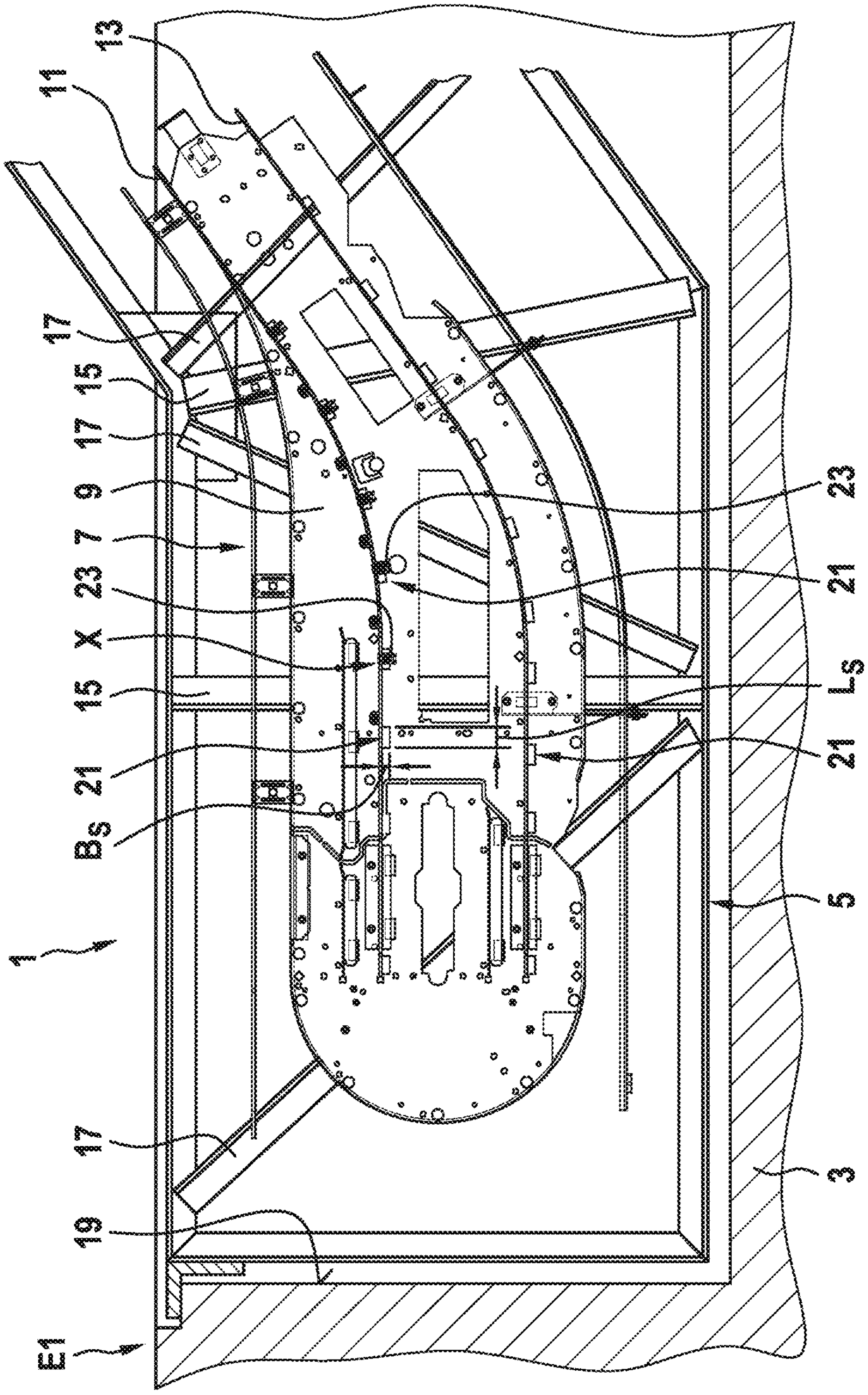
FIG. 1 is a central longitudinal sectional view of a part of an escalator arranged on a lower story of a building, said escalator comprising a structural framework and a guide rail system installed in the structural framework.

FIG. 1 is a central longitudinal sectional view of a part of an escalator 1 arranged on a lower story E1 of a building 3. The escalator 1 comprises a structural framework 5 and a guide rail system 7 installed in the structural framework 5. The guide rail system 7 comprises two side plates 9 (only one is shown on account of the central longitudinal sectional view), between which a step band (not shown) is guided on guide rail sections 11, 13. In order to keep the installation width of the escalator 1 small, the side plates 9 are arranged close to the laterally protruding structural elements such as the posts 15 and cross stays 17 of the structural framework 5. Walls 19 of the building 3 typically adjoin the outside of the structural framework 5 at a small spacing, such that the surface of the side plate 9 facing towards the structural elements 15, 17 of the structural framework 5 is inaccessible for assembly work. However, the side of the side plate 9 facing away from the structural elements 15, 17, on which side the guide rail sections 11, 13 are arranged, is very easily accessible if, as shown, the step band has been removed.

By means of an angle grinder, guide rail sections 11, 13 that are welded to the side plate 9 and are to be replaced can now be removed. The weld joints to be separated are typically arranged in the region of what are known as welding windows. Said welding windows are rectangular and thus constitute pre-existing holes 21 which can be used for assembling the new guide rail sections 11, 13. For assembly of the guide rail sections 11, 13, rail fastening devices 23 are provided.

The area of the holes 21 has a rectangular cross section having a hole length $L_S$ and a hole width $B_S$, the hole length $L_S$ being significantly greater than the hole width $B_S$. The lower guide rail section 13 is still welded to the side plate 9. The upper guide rail section 11 has already been replaced, and therefore fastened to the side plate 9 by means of rail fastening devices 23.

Figure 2:
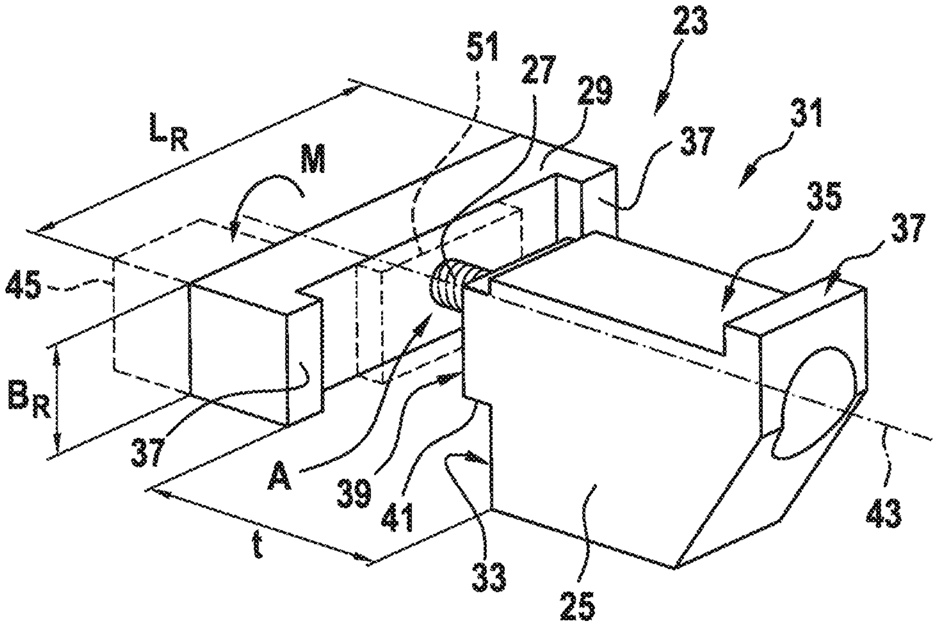
FIG. 2 is a three-dimensional view of a rail fastening device in the pre-assembled state.

As shown in three-dimensions in FIG. 2, the rail fastening device 23 essentially comprises a rail receiving part 25, a screw connection 27 and a clamping bar piece 29. The rail receiving part 25 comprises a rail receiving region 31 and a support surface 33. In the fully assembled state, the support surface 33 is supported against the side plate 9. The rail receiving region 31 essentially comprises a contact face 35 and a protrusion 37. The exact function of the protrusion 37 is explained below in connection with the description of FIGS. 3 and 4.

Figure 4:
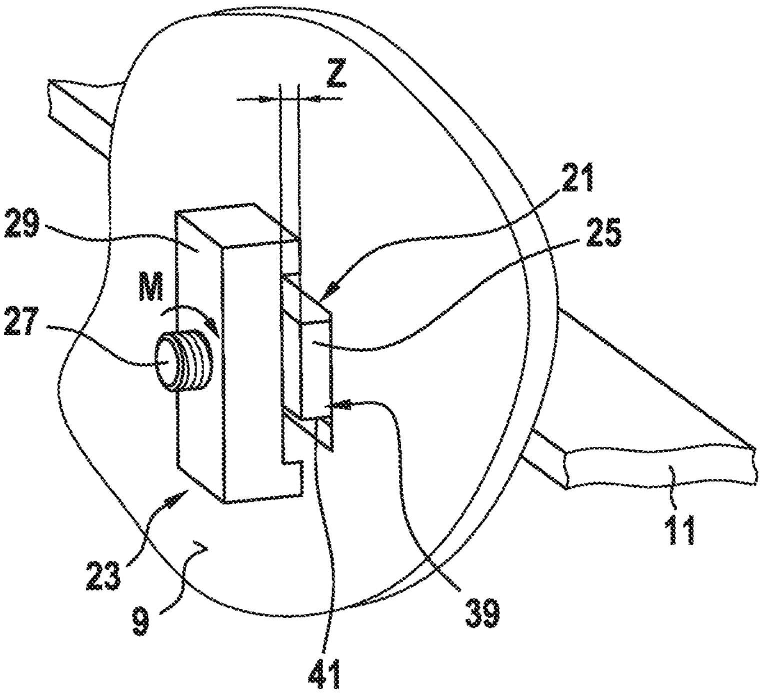
FIG. 4 is a three-dimensional view of the rail fastening device in FIG. 3, viewed from a side inaccessible for a mechanic.

The length $L_R$ and width $_R$ of the clamping bar piece 29 match the hole width $B_S$ and the hole length $L_S$ of the hole 21 (see FIG. 1) such that the clamping bar piece 25 can be guided through the hole 21 in the first position shown in FIG. 2, in the pre-assembled state, and can be supported on the material of the side plate 9 surrounding the hole 11 in a second position, in the fully assembled state (see FIG. 4).

In other words, in the fully assembled state a central region of the rail fastening device 23 protrudes through the hole 21 and clamps edge portions of the hole 21 or the side plate 9 between the support surface 33 and the surfaces 37 of the clamping bar piece 29 which face the side plate 9 and are in contact thereon. This achieves a very stable and wide bracing of forces which could act on the rail receiving part 25 and have to be braced via the side plate 9.

In order to simplify the assembly of a guide rail section 11, 13, the rail fastening device 23 is preferably pre-assembled, as shown in FIG. 2. In the pre-assembled state, the rail receiving part 25 is connected to the clamping bar piece 29 by means of the screw connection 27. Furthermore, the clamping bar piece 29 is connected to the rail receiving part 25 by means of the screw connection 27 in such a way that the clamping bar piece 29 is mounted so as to be pivotable, relative to the rail receiving part 25, about the central longitudinal axis 43 of the screw or the screw connection 27. In order to be able to later secure the screw connection 27, an anaerobic adhesive can be applied in the region denoted by an arrow A. Of course, screws can also be used for the screw connection 27, which screws already have a microencapsulated adhesive applied to the thread thereof by the manufacturer.

In order that the pre-assembled rail fastening device 23 can be fastened to the side plate 9, an assembly spacing t must be preset between the rail receiving part 25 and the clamping bar piece 29, which spacing is greater than a thickness s (see FIG. 3) of the side plate 9 in the region of the hole 21. This is because the clamping bar piece 29 otherwise still protrudes in part into the hole 21 and therefore cannot be pivoted.

In order to additionally simplify the assembly, a pivot weight 45, indicated by a dashed line, can be arranged on the clamping bar piece 29, which pivot weight pivots the clamping bar piece 29 of the pre-assembled rail fastening device 23 automatically from the first position into the provided second position, on account of the torque M caused by gravity, after said clamping bar piece has been guided through the hole 21. Of course, said pivot weight 45 is not absolutely essential; the torque M can also be generated by means of a screwdriver and transmitted to the clamping bar piece 29 via the screw connection 27.

Figure 3:
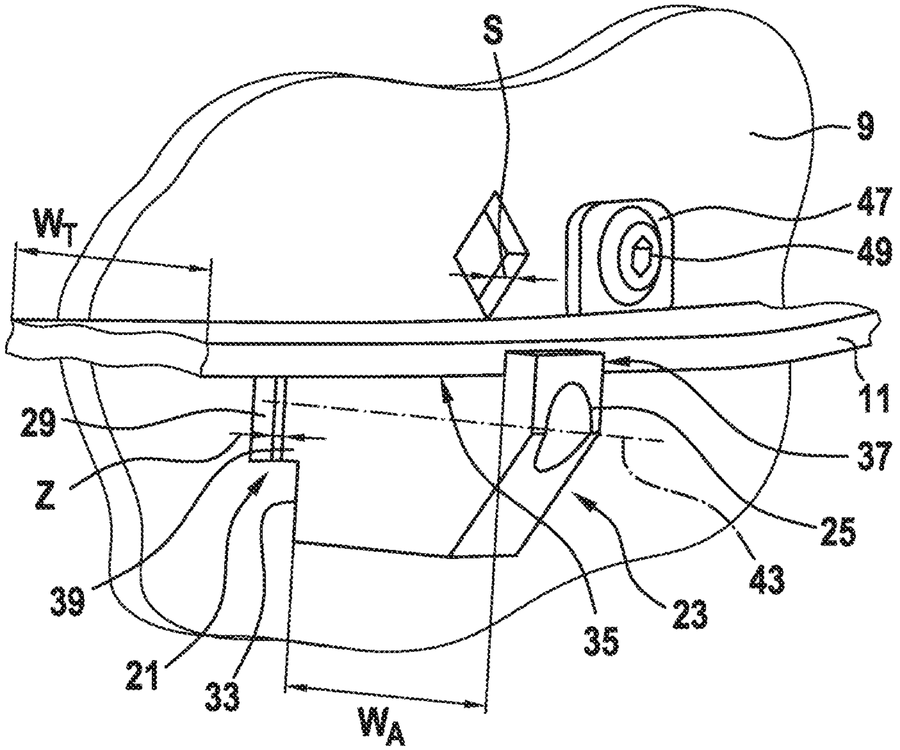
FIG. 3 is a three-dimensional view of a rail fastening device which is arranged on a side plate of the guide rail system shown in FIG. 1, viewed from a side accessible for a mechanic.

The fully assembled state of the rail fastening device 23 is shown in FIGS. 3 and 4, which will be described together in the following. FIG. 3 is a three-dimensional detail of that rail fastening device 23 which is denoted by an arrow X in FIG. 1. All the other rail fastening devices 23 shown in FIG. 1 preferably likewise correspond to said rail fastening device 23. In this case, FIG. 3 shows the rail fastening device 23 from the side of the side plate 9 that is easily accessible for a mechanic. FIG. 4 is a three-dimensional detail of this same rail fastening device 23 of FIG. 3, from the side which a mechanic can access only with difficulty.

The rail fastening device 23 assembled on the side plate 9 comprises the components shown in FIG. 2. In this case, the width W A of the contact face 35 of the rail receiving part 25, delimited by the protrusion 37, is slightly shorter here than the width W T of the guide rail section 11 resting on the contact face 35. If the screw connection 27 (indicated in FIG. 3 by the central longitudinal axis 43 thereof) of the rail fastening device 23 is now tightened, the support surface 33 is supported against the side plate 9, and in addition the guide rail or the guide rail section 11 is clamped between the side plate 9 and the protrusion 37. However, this is only possible if, when the screw connection 27 is tightened, there is still a gap Z between the rail receiving part 25 and the clamping bar piece 29.

The mode of operation of the anti-rotation device 39 formed on the rail receiving part 25 is also clearly visible in FIG. 4. By means of said anti-rotation device 39, a torque M applied to the rail receiving part 25 by the screw connection 27, by means of which torque the clamping bar piece 29 is intended to be pivoted during the assembly process, can be supported in a form-fitting manner in the hole 21. This both facilitates the course of the assembly, and prevents the rail receiving part 25 from rotating, as long as the screw connection 27 is not yet securely tightened and the guide rail section 11 is not yet resting on the contact face 35. Furthermore, the weight forces of the step band acting on the guide rail section 11 are supported in a form-fitting manner over a surface 41 of the anti-rotation device 39, such that the screw connection 27 does not have to be designed to be as strong in order, for example, to achieve a sufficient frictional connection between the support surface 33 and the side plate 9.

As shown in FIG. 3, the rail fastening device 23 can furthermore comprise a counter holder 47 which, in the present embodiment, can be fastened to the side plate 9 by means of a screw 49. If the rail fastening device 23 is in the fully assembled state, the guide rail section 11 fastened to the side plate 9 is arranged between the rail receiving part 25 and the counter holder 47. A counter holder 47 of this kind thus prevents the guide rail section 11 from being able to lift off from the rail receiving part 25.

Although FIG. 1 shows a part of an escalator 1, it is obvious that the rail fastening device 23 can also be used in guide rail systems 7 of a moving walkway. Furthermore, alternatively thereto or in combination with the anti-rotation device 39 shown in FIG. 2, an analogously designed deadlock anti-rotation device 51 can be provided on the clamping bar piece 29. By means of said deadlock anti-rotation device 51, a torque M applied to the clamping bar piece 29 by the screw connection 27 can also be supported in a form-fitting manner in the hole 21. However, it is then necessary to ensure, during assembly, that the assembly spacing t is sufficiently large for the deadlock anti-rotation device 51 to be located outside of the hole 21, for the purpose of pivoting. After pivoting, the entire rail fastening device 23 can be retracted slightly, until the deadlock anti-rotation device 51 engages in the hole 21. Subsequently, the screw connection 27 can be tightened with a provided tightening torque.

Finally, it should be noted that terms such as "having," "comprising," etc. do not preclude other elements or steps and terms such as "a" or "an" do not preclude a plurality. Furthermore, it should be noted that features or steps which have been described with reference to one of the above embodiments may also be used in combination with other features or steps of other embodiments described above. Reference signs in the claims should not be considered to be limiting.

The invention claimed is:

1. A rail fastening device for fastening guide rail sections in a guide rail system of an escalator or a moving walkway, wherein the guide rail system comprises at least one side plate having a hole, an area of the hole having a hole length which is greater than a hole width, the rail fastening device comprising:

- a rail receiving part, a screw connection, and a clamping bar piece, wherein the rail fastening device is configured to transition from a pre-assembled state into a fully assembled state;
- wherein, in the pre-assembled state, the clamping bar piece is connected to the rail receiving part by the screw connection such that that the clamping bar piece is pivotable relative to the rail receiving part about a central longitudinal axis of the screw connection;
- wherein the rail receiving part comprises a rail receiving region and a support surface, wherein the support surface is supported against the side plate in the fully assembled state; and
- wherein a length and a width of the clamping bar piece correspond to the hole width and the hole length of the hole such that the clamping bar piece can be guided through the hole in a first position and can be supported on the side plate surrounding the hole in a second position, in the fully assembled state.

2. The rail fastening device of claim 1, wherein a profile of the clamping bar piece are rectangular in shape.

3. The rail fastening device of claim 1, further comprising a pivot weight arranged on the clamping bar piece, wherein the pivot weight is configured to pivot the clamping bar piece of the rail fastening device, after guidance thereof through the hole, from the first position into the second position due to gravity.

4. The rail fastening device of claim 1, wherein, further comprising an aerobic adhesive or microencapsulated adhesive that secures the screw connection of the rail fastening device in the fully assembled state.

5. The rail fastening device of claim 1, further comprising a counter holder, configured to fasten to the side plate, wherein, in the fully assembled state, the guide rail section fastened to the side plate is arranged between the rail receiving part and the counter holder.

6. The rail fastening device of claim 1, wherein the rail receiving part comprises a contact face and a protrusion and wherein a width of the contact face delimited by the protrusion is shorter than a width of the guide rail section to be received by the rail receiving part.

7. The rail fastening device of claim 1, further comprising an anti-rotation device on the clamping bar piece, by which anti-rotation device a torque applied to the clamping bar piece by the screw connection can be supported in a form-fitting manner in the hole.

8. The rail fastening device of claim 1, further comprising an anti-rotation device on the rail receiving part, by which anti-rotation device a torque applied to the rail receiving part by the screw connection can be supported in a form-fitting manner in the hole.

9. The rail fastening device of claim 1, wherein the rail fastening device is pre-assembled, in that the rail receiving part is connected to the clamping bar piece by the screw connection, and wherein an assembly spacing is preset between the rail receiving part and the clamping bar piece, which assembly spacing is greater than a thickness of the side plate in the region of the hole for which said rail fastening device is provided.

10. A guide rail system of an escalator or a moving walkway, the guide rail system comprising:

at least one guide rail section and at least one side plate having at least one hole, an area of the at least one hole having a hole length which is greater than its hole width; and at least one rail fastening device arranged in the at least one hole, the at least one rail fastening device fastening the at least one guide rail section is fastened to the at least one side plate, and the at least one rail fastening device comprising:

a rail receiving part, a screw connection, and a clamping bar piece, wherein the rail fastening device is configured to transition from a pre-assembled state into a fully assembled state;

wherein, in the pre-assembled state, the clamping bar piece is connected to the rail receiving part by the screw connection such that that the clamping bar piece is pivotable relative to the rail receiving part about a central longitudinal axis of the screw connection;

wherein the rail receiving part comprises a rail receiving region and a support surface, wherein the support surface is supported against the side plate in the fully assembled state; and wherein a length and a width of the clamping bar piece correspond to the hole width and the hole length of the hole such that the clamping bar piece can be guided through the hole in a first position and can be supported on the side plate surrounding the hole in a second position, in the fully assembled state.

11. The guide rail system of claim 10, wherein the rail fastening device further comprises a pivot weight arranged on the clamping bar piece, wherein the pivot weight is configured to pivot the clamping bar piece of the rail fastening device, after guidance thereof through the hole, from the first position into the second position due to gravity.

12. The guide rail system of claim 10, wherein the rail fastening device further comprises an aerobic adhesive or microencapsulated adhesive that secures the screw connection of the rail fastening device in the fully assembled state.

13. The guide rail system of claim 10, wherein the rail fastening device further comprises a counter holder, configured to fasten to the side plate, wherein, in the fully assembled state, the guide rail section fastened to the side plate is arranged between the rail receiving part and the counter holder.

14. The guide rail system of claim 10, wherein the rail receiving part comprises a contact face and a protrusion and wherein a width of the contact face delimited by the protrusion is shorter than a width of the guide rail section to be received by the rail receiving part.

15. The guide rail system of claim 10, wherein the rail fastening device further comprises an anti-rotation device on the clamping bar piece, by which anti-rotation device a torque applied to the clamping bar piece by the screw connection can be supported in a form-fitting manner in the hole.

16. The guide rail system of claim 10, wherein the rail fastening device further comprises an anti-rotation device on the rail receiving part, by which anti-rotation device a torque applied to the rail receiving part by the screw connection can be supported in a form-fitting manner in the hole.

17. An escalator or moving walkway comprising the at least one guide rail system according of claim 10.

18. A method for servicing or modernizing the guide rail system of the escalator or the moving walkway, wherein the guide rail system comprises at least one side plate having at least one hole, the area of the hole having the hole length which is greater than its hole width, and at least one rail fastening device of claim 1 for fastening guide rail sections being present in the guide rail system, wherein the rail fastening device is pre-assembled, in that the rail receiving part is connected to the clamping bar piece by means of the screw connection, and an assembly spacing is preset between the rail receiving part and the clamping bar piece, which assembly spacing is greater than a thickness of the side plate in the region of the hole.

19. The method of claim 18, wherein:

in a further step, the clamping bar piece of a pre-assembled rail fastening device is brought into a first position and is thus aligned, with respect to its length and width, to the hole length and the hole length of the hole;

in a further step, the clamping bar piece is guided through the hole until the support surface of the rail receiving part rests on the side plate;

in a further step, the clamping bar piece is pivoted about the central longitudinal axis of the screw connection and thus brought into a second position; and in a further step, the rail fastening device is brought into a fully assembled state, in that the screw connection is tightened with a predetermined screw tightening torque, while the clamping bar piece is held in the second position, until the clamping bar piece is positioned on the material of the side plate surrounding the hole and the support surface of the rail receiving part and/or the guide rail section to be fastened presses against the side plate.

* * * * *